United States Patent
Homsy et al.

(10) Patent No.: US 10,288,501 B2
(45) Date of Patent: May 14, 2019

(54) TORSION RELIEVING POWER CABLE

(71) Applicant: Makani Technologies LLC, Alameda, CA (US)

(72) Inventors: George Homsy, San Rafael, CA (US); Jeff Reid, Palo Alto, CA (US)

(73) Assignee: MAKANI TECHNOLOGIES LLC, Alameda, CA (US)

( * ) Notice: Subject to any disclaimer, the term of this patent is extended or adjusted under 35 U.S.C. 154(b) by 0 days.

(21) Appl. No.: 15/725,428

(22) Filed: Oct. 5, 2017

(65) Prior Publication Data
US 2018/0094993 A1    Apr. 5, 2018

Related U.S. Application Data

(60) Provisional application No. 62/404,295, filed on Oct. 5, 2016.

(51) Int. Cl.
*H01R 4/00* (2006.01)
*G01L 3/08* (2006.01)
(Continued)

(52) U.S. Cl.
CPC ............... *G01L 3/08* (2013.01); *G01L 5/101* (2013.01); *H01B 7/04* (2013.01); *H01B 7/043* (2013.01);
(Continued)

(58) Field of Classification Search
CPC . H01B 7/02; H01B 7/04; H01B 7/043; H01B 9/02; H01B 9/026; G01L 3/08; G01L 5/101; F03D 9/255; F03D 5/00
(Continued)

(56) References Cited

U.S. PATENT DOCUMENTS 3,918,537 A * 11/1975 Heilhecker ........... E21B 17/003
174/47
6,325,330 B1 * 12/2001 Lavan, Jr. ................. B64B 1/50
244/24
(Continued)

FOREIGN PATENT DOCUMENTS

JP      2016-077143 A    5/2016

OTHER PUBLICATIONS

Notification of Transmittal of the International Search Report and the Written Opinion of the International Searching Authority, or the Declaration dated Jan. 30, 2018, issued in connection with International Application No. PCT/US2017/055252, filed on Oct. 5, 2017, 2 pages.
(Continued)

*Primary Examiner* — William H. Mayo, III
(74) *Attorney, Agent, or Firm* — McDonnell Boehnen Hulbert & Berghoff LLP

(57) ABSTRACT

A power cable and method of forming the cable that includes a first conductor guide that includes (i) a first distal receiving hole and (ii) a first axial receiving hole on a longitudinal axis of the power cable. The power cable also includes a second conductor guide that includes (i) a second distal receiving hole and (ii) a second axial receiving hole on the longitudinal axis. The power cable also includes a flexible drive shaft that is disposed in the first axial receiving hole and the second axial receiving hole and a conductor that twists around the longitudinal axis. The conductor is disposed in the first distal receiving hole and the second distal receiving hole.

20 Claims, 14 Drawing Sheets

(51) Int. Cl.
    *H01B 7/04*     (2006.01)
    *H01B 9/02*     (2006.01)
    *G01L 5/10*     (2006.01)
    *F03D 5/00*     (2006.01)
    *F03D 9/25*     (2016.01)

(52) U.S. Cl.
    CPC ............... *H01B 9/026* (2013.01); *F03D 5/00* (2013.01); *F03D 9/255* (2017.02)

(58) Field of Classification Search
    USPC ..... 174/102 R, 103, 106 R, 108, 109, 110 R, 174/113 R, 74 R, 72 R
    See application file for complete search history.

(56) References Cited

U.S. PATENT DOCUMENTS

| | | | |
|---|---|---|---|
| 2008/0265086 A1* | 10/2008 | Lee | B64B 1/50 244/30 |
| 2013/0062092 A1 | 3/2013 | Hui et al. | |
| 2014/0286778 A1* | 9/2014 | Moestrup | F03D 1/06 416/205 |
| 2015/0041598 A1 | 2/2015 | Nugent et al. | |
| 2015/0048621 A1* | 2/2015 | Smeenk | F03D 5/06 290/55 |
| 2015/0222106 A1* | 8/2015 | Caspari | H02G 3/32 174/651 |
| 2016/0056621 A1* | 2/2016 | Patten | F03D 9/30 174/40 R |

OTHER PUBLICATIONS

International Search Report dated Jan. 30, 2018, issued in connection with International Application No. PCT/US2017/055252, filed on Oct. 5, 2017, 4 pages.

Written Opinion of the International Searching Authority dated Jan. 30, 2018, issued in connection with International Application No. PCT/US2017/055252, filed on Oct. 5, 2017, 10 pages.

* cited by examiner

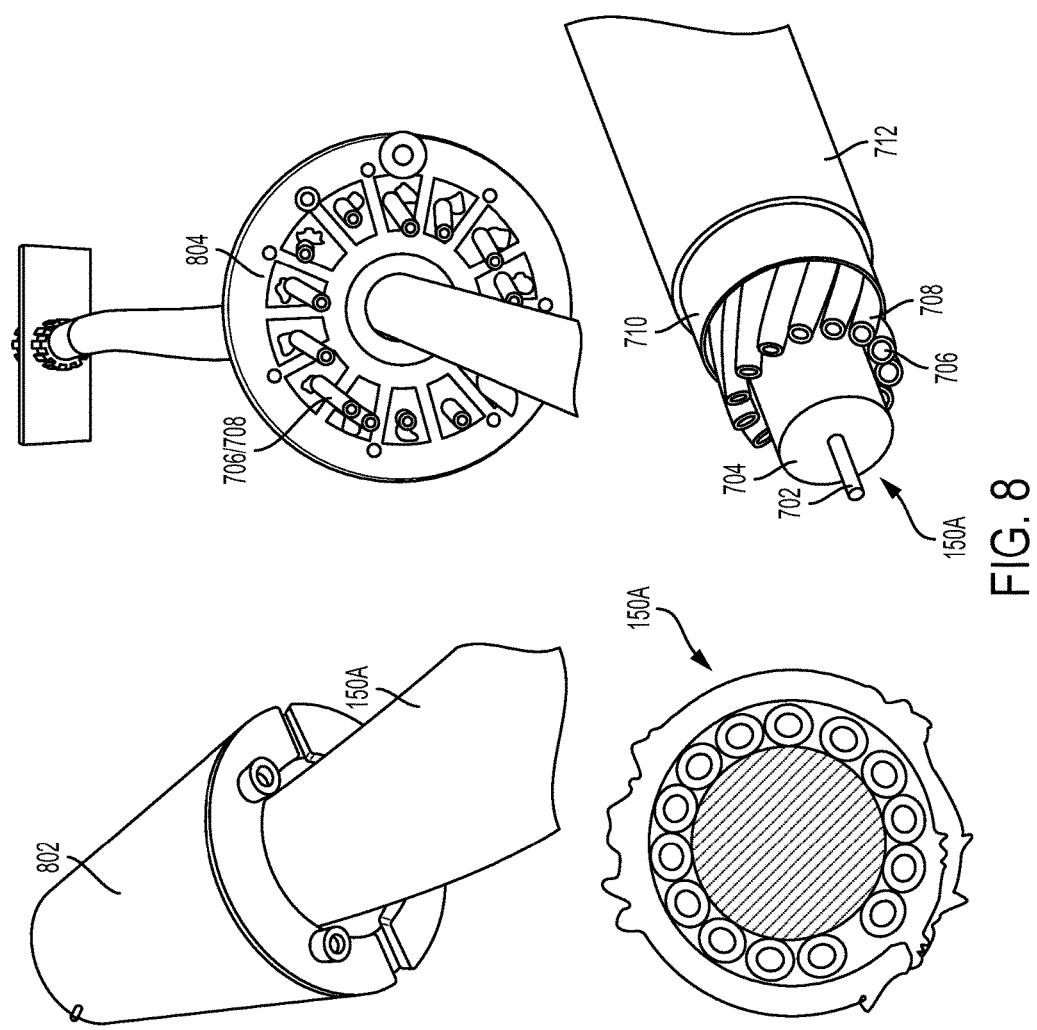

TORSION RELIEVING POWER CABLE

CROSS REFERENCE TO RELATED APPLICATIONS

This application claims priority to U.S. Provisional Patent Application No. 62/404,295, filed on Oct. 5, 2016, entitled "Torsion Relieving Power Cable," which is incorporated herein by reference in its entirety.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Some technical environments involve a power cable that becomes twisted while carrying large amounts of electrical power. Any power cable will generally have a limit to how much torsion can accumulate within the power cable before the power cable fails. As such, it may be useful to attach a slip ring to one end of the power cable as a mechanism for relieving torsion as power is transmitted between the ends of the power cable. However, a slip ring that is large enough to transfer significant amounts of electrical power may require a substantial amount of torque to rotate, due to the size of the slip ring. In some cases, this amount of torque may exceed a torque at which the power cable might fail. Accordingly, there is a need for a power cable that is capable of transmitting large amounts of electrical power while also transferring a large amount of torque between ends of the power cable.

One aspect of the disclosure is a power cable that includes a first conductor guide that includes (i) a first distal receiving hole and (ii) a first axial receiving hole on a longitudinal axis of the power cable. The power cable further includes a second conductor guide that includes (i) a second distal receiving hole and (ii) a second axial receiving hole on the longitudinal axis. The power cable further includes a flexible drive shaft that is disposed in the first axial receiving hole and the second axial receiving hole and a conductor that twists around the longitudinal axis. The conductor is disposed in the first distal receiving hole and the second distal receiving hole.

Another aspect of the disclosure is a method of forming a power cable. The method includes inserting a flexible drive shaft through a first axial receiving hole on a longitudinal axis of a first conductor guide and through a second axial receiving hole on a longitudinal axis of a second conductor guide. The method further includes inserting a conductor through a first distal receiving hole in the first conductor guide and inserting the conductor through a second distal receiving hole in the second conductor guide such that the conductor twists around the longitudinal axis of the first conductor guide.

Another aspect of the disclosure is a power cable that includes a first conductor guide that includes (i) a first plurality of distal receiving holes and (ii) a first axial receiving hole on a longitudinal axis of the power cable. The first conductor guide includes a rigid insulating material and each distal receiving hole of the first plurality of distal receiving holes is positioned at a common radial distance from the first axial receiving hole. The power cable further includes a second conductor guide that includes (i) a second plurality of distal receiving holes and (ii) a second axial receiving hole on the longitudinal axis of the power cable. The second conductor guide includes a rigid insulating material and each distal receiving hole of the second plurality of distal receiving holes is positioned at the common radial distance from the second axial receiving hole. The power cable further includes a flexible drive shaft that is disposed in the first axial receiving hole and the second axial receiving hole. The power cable further includes a plurality of conductors that twist around the longitudinal axis. The plurality of conductors are disposed respectively in the first plurality of distal receiving holes and respectively in the second plurality of distal receiving holes. For each conductor of the plurality of conductors, the distal receiving hole of the first plurality of distal receiving holes in which the conductor is disposed in is at an azimuthal position that is different from an azimuthal position of the distal receiving hole of the second plurality of distal receiving holes in which the conductor is disposed in. The power cable further includes an insulating spacer between the first conductor guide and the second conductor guide. The insulating spacer surrounds at least a portion of the flexible drive shaft that is between the first conductor guide and the second conductor guide and is between the flexible drive shaft and the plurality of conductors. The plurality of conductors twist around the insulating spacer. The power cable further includes an insulating jacket that surrounds the plurality of conductors, the first conductor guide, the second conductor guide, and the flexible drive shaft.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 8 depicts various views of a power cable, according to an example embodiment.

DETAILED DESCRIPTION

Figure 1:
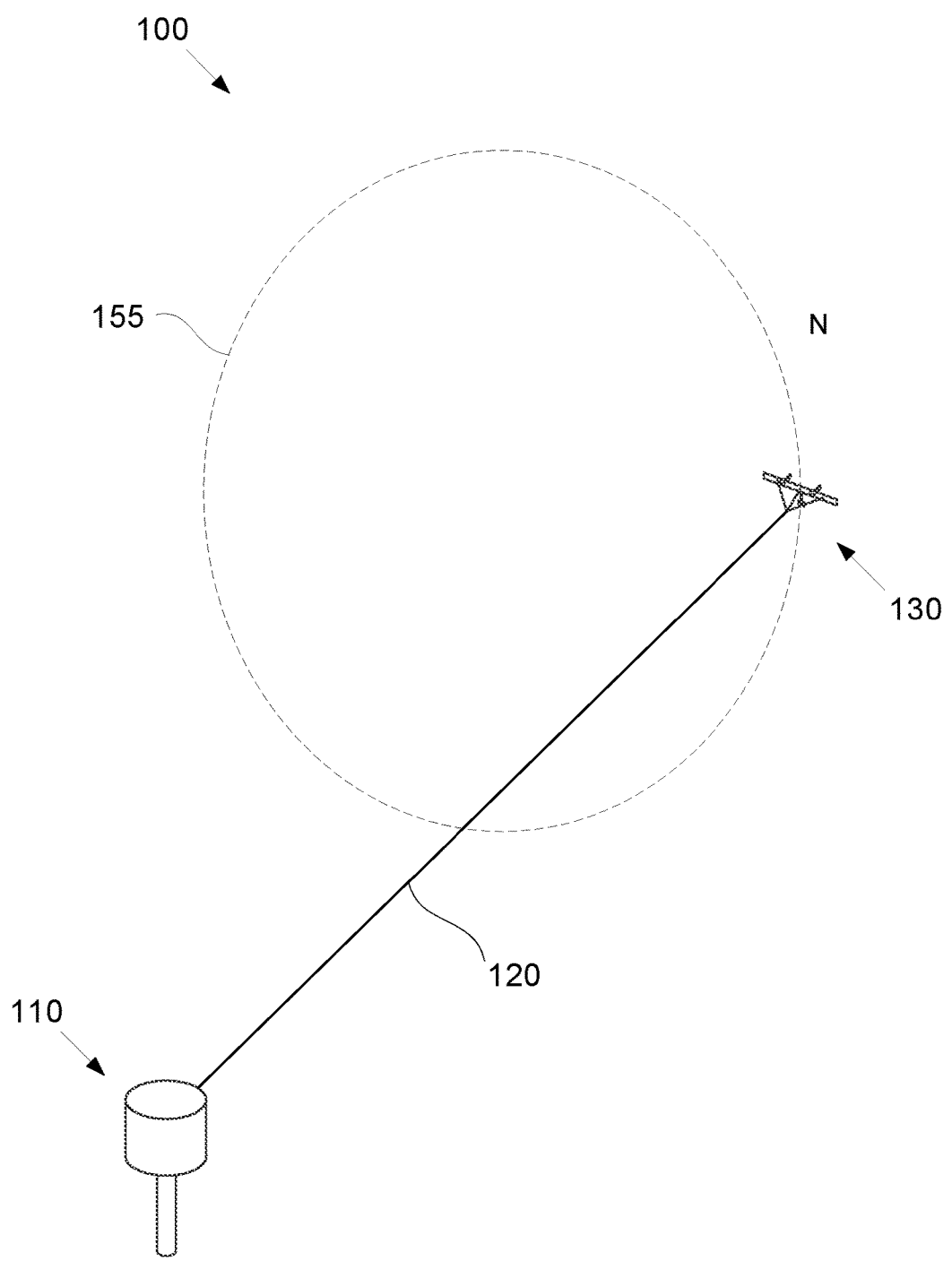
FIG. 1 depicts an airborne wind turbine (AWT), according to an example embodiment.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or fewer of each element shown in a given Figure. Further, some of the illustrated elements may be combined or omitted. Yet further, an example embodiment may include elements that are not illustrated in the Figures.

An airborne wind turbine (AWT) may include a ground station, a tether, and an aerial vehicle. Generally, an aerial vehicle may conduct crosswind flight power generation or other aerial power generation modes (e.g., lighter-than-air turbines) to generate electrical power that is transmitted down to a ground station via a tether. The tether may include one or more conductors for transmitting power between the aerial vehicle and the ground station, and one or more conductors for transmitting control signals and sensory data between the ground station and the aerial vehicle. In crosswind flight, the aerial vehicle may make revolutions in a substantially circular or a substantially elliptical path that is substantially perpendicular to the wind. As a result, the tether may become twisted. As this torsion on the tether accumulates, the tether may eventually fail (e.g., the conductors may break).

As such, it may be useful to use a torsion relieving power cable in conjunction with a slip ring to facilitate transmission of power and control signals between the stationary control station and the twisting tether. However, a slip ring that is large enough to transfer significant amounts of power may require a substantial amount of torque to rotate, due to the size of the slip ring. In some cases, this amount of torque may exceed a torque at which the tether might fail. Additionally, it may be useful for the power cable to be able to transfer significant amounts of torque to the slip ring where the axis of rotation of the slip ring is not collinear or parallel with the axis of rotation of the tether. Accordingly, there is a need for a power cable that is capable of transmitting large amounts of electrical power while also transferring a large amount of torque from the tether to the rotatable slip ring (or vice versa), perhaps in situations where the axes of rotation corresponding respectively to the tether and the slip ring are not collinear or parallel. In that respect, such a power cable may serve as a flexible drive shaft.

Embodiments herein include example power cables capable of transferring 600 kW at 4.2 kV DC bidirectionally between the slip ring and the tether while also transmitting at least 5 to 10 (or more) newton-meters (N·m) of torque bi-directionally between the slip-ring and the tether, for predetermined time periods at least as long as 30 minutes. Such power cables may have an operating lifetime of at least 10 years, but other examples are possible. Such power cables may have a diameter to bend radius ratio of 5 to 1, which may be 33% lower than conventional power cables. Some embodiments may include 14 conductors of gauges ranging from 10 to 12, may include insulation rated for 4.2 kV DC, may be configured to withstand 10 million rotations of the tether/aerial vehicle before significant performance degradations occur, and may have an outer diameter that does not exceed 200 mm. Other examples are possible.

FIG. 1 depicts an airborne wind turbine (AWT) 100, according to an example embodiment. In particular, the AWT 100 includes a ground station 110, a tether 120, and an aerial vehicle 130. As shown in FIG. 1, the tether 120 may be connected to the aerial vehicle 130 at a first end and may be connected to the ground station 110 at a second end. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the aerial vehicle 130 is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, the ground station 110 may be configured for use on land. However, the ground station 110 may also be implemented on a body of water, such as a lake, river, sea, or ocean. For example, a ground station could include or be arranged on a floating offshore platform or a boat, among other possibilities. Further, the ground station 110 may be configured to remain stationary or to move relative to the ground or the surface of a body of water.

In addition, the ground station 110 may include one or more components (not shown), such as a winch, that may vary a deployed length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands on the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core of the tether 120 may be constructed of any high strength fibers. In some examples, the tether 120 may have a fixed length and/or a variable length.

For instance, in at least one such example, the tether 120 may have a length of 140 meters.

The aerial vehicle 130 may be configured to fly substantially along a closed path 155 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic, and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 155 may be different shapes in various embodiments. For example, the closed path 155 may be substantially circular. And in at least one such example, the closed path 155 may have a radius of up to 265 meters. The term "substantially circular," as used in this disclosure, refers to exactly circular and/or one or more deviations from exactly circular that do not significantly impact generation of electrical energy as described herein. Other shapes for the closed path 155 may be an oval, such as an ellipse, the shape of a jelly bean, the shape of the number of 8, etc.

The aerial vehicle 130 may be operated to travel along one or more revolutions of the closed path 155. As shown in FIG. 1, the number of revolutions of the closed path 155 that the aerial vehicle 130 has traveled along may be represented by N.

Figure 2:
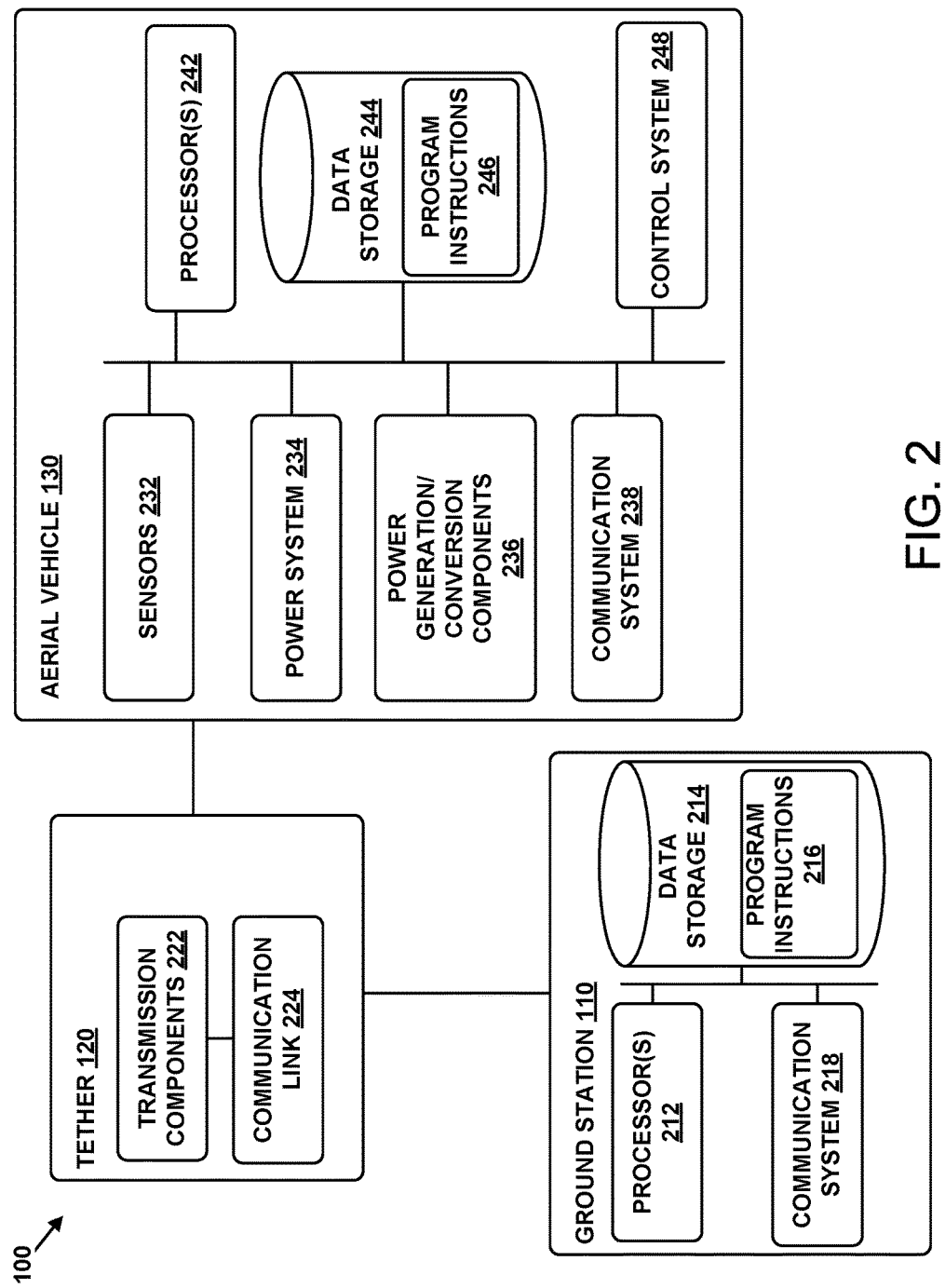
FIG. 2 is a simplified block diagram illustrating components of an AWT, according to an example embodiment.

FIG. 2 is a simplified block diagram illustrating components of the AWT 100. As shown in FIG. 2, the ground station 110 may include one or more processors 212, data storage 214, and program instructions 216. A processor 212 may be a general-purpose processor or a special-purpose processor (e.g., a digital signal processor, an application-specific integrated circuit, etc.). The one or more processors 212 can be configured to execute computer-readable program instructions 216 that are stored in data storage 214 and are executable to provide any of the functionality described herein.

In some implementations, the processor 212 may be implemented as a Boolean circuit or a combinational logic circuit.

The data storage 214 may include or take the form of one or more computer-readable storage media that may be read or accessed by at least one processor 212. The one or more computer-readable storage media can include volatile and/or non-volatile storage components, such as optical, magnetic, organic, or other memory or disc storage, which may be integrated in whole or in part with at least one of the one or more processors 212. In some embodiments, the data storage 214 may be implemented using a single physical device (e.g., one optical, magnetic, organic, or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 110. As such, the data storage 214 may include program instructions to perform or facilitate some or all of the functionality described herein.

In a further respect, the ground station 110 may include a communication system 218. The communication system 218 may include one or more wireless interfaces and/or one or more wireline interfaces, which allow the ground station 110 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or a similar interface to communicate via a wire, a twisted pair of wires, a coaxial cable, an optical link, a fiber-optic link, or another physical connection to a wireline network. The ground station 110 may communicate with the aerial vehicle 130, other ground stations, and/or other entities (e.g., a command center) via the communication system 218.

In an example embodiment, the ground station 110 may include a communication system 218 that allows for both short-range communication and long-range communication. For example, the ground station 110 may be configured for short-range communications using Bluetooth and for long-range communications under a CDMA protocol. In such an embodiment, the ground station 110 may be configured to function as a "hotspot," or in other words, as a gateway or proxy between a remote support device (e.g., the tether 120, the aerial vehicle 130, and other ground stations) and one or more data networks, such as a cellular network and/or the Internet. Configured as such, the ground station 110 may facilitate data communications that the remote support device might otherwise be unable to perform by itself.

For example, the ground station 110 may provide a WiFi connection to the remote device, and serve as a proxy or gateway to a cellular service provider's data network, which the ground station 110 might connect to under an LTE or a 3G protocol, for instance. The ground station 110 could also serve as a proxy or a gateway to other ground stations or a command center, which the remote device might not be able to otherwise access.

Moreover, as shown in FIG. 2, the tether 120 may include transmission components 222 and a communication link 224. The transmission components 222 may be configured to transmit electrical energy from the aerial vehicle 130 to the ground station 110 and/or transmit electrical energy from the ground station 110 to the aerial vehicle 130. The transmission components 222 may take different forms in different embodiments. For example, the transmission components 222 may include one or more conductors that are configured to transmit electricity. In at least one such example, the one or more conductors may include aluminum and/or any other material which allows for conduction of electric current. Moreover, in some implementations, the transmission components 222 may surround a core of the tether 120 (not shown).

The ground station 110 could communicate with the aerial vehicle 130 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 130 may include one or more sensors 232, a power system 234, power generation/conversion components 236, a communication system 238, one or more processors 242, data storage 244, program instructions 246, and a control system 248.

The sensors 232 could include different sensors in different embodiments. For example, the sensors 232 may include a global positioning system (GPS) receiver. The GPS receiver may be configured to provide data that is typical of well-known GPS systems (which may be referred to as a global navigation satellite system (GNSS)), such as the GPS coordinates of the aerial vehicle 130. Such GPS data may be utilized by the AWT 100 to provide various functions described herein.

As another example, the sensors 232 may include one or more wind sensors, such as one or more pitot tubes. The one or more wind sensors may be configured to detect apparent and/or relative wind speed and/or direction. Such wind data may be utilized by the AWT 100 to provide various functions described herein.

Still as another example, the sensors 232 may include an inertial measurement unit (IMU). The IMU may include both an accelerometer and a gyroscope, which may be used together to determine the orientation of the aerial vehicle 130. In particular, the accelerometer can measure the orientation of the aerial vehicle 130 with respect to earth, while the gyroscope measures the rate of rotation around an axis, such as a centerline of the aerial vehicle 130. IMUs are commercially available in low-cost, low-power packages. For instance, the IMU may take the form of or include a miniaturized micro-electro-mechanical system (MEMS) or a nano-electro-mechanical System (NEMS). Other types of IMUs may also be utilized. The IMU may include other sensors, in addition to accelerometers and gyroscopes, which may help to better determine the position and orientation of the aerial vehicle 130. Two examples of such sensors are magnetometers and pressure sensors. Other examples are also possible.

While an accelerometer and a gyroscope may be effective at determining the orientation of the aerial vehicle 130, slight errors in measurement may compound over time and result in a more significant error. However, an example aerial vehicle 130 may be able mitigate or reduce such errors by using a magnetometer to measure direction. One example of a magnetometer is a low-power digital 3-axis magnetometer, which may be used to realize an orientation-independent electronic compass for accurate heading information. However, other types of magnetometers may be utilized as well.

The aerial vehicle 130 may also include a pressure sensor or barometer, which can be used to determine the altitude of the aerial vehicle 130. Alternatively, other sensors, such as sonic altimeters or radar altimeters, can be used to provide an indication of altitude, which may help to improve the accuracy of and/or prevent drift of the IMU. In addition, the aerial vehicle 130 may include one or more load cells configured to detect forces distributed between a connection of the tether 120 to the aerial vehicle 130.

As noted, the aerial vehicle 130 may include the power system 234. The power system 234 could take different forms in different embodiments. For example, the power system 234 may include one or more batteries for providing power to the aerial vehicle 130. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 130. In some implementations, the one or more motors or engines may be powered by a fuel, such as a hydrocarbon-based fuel. And in such implementations, the fuel could be stored on the aerial vehicle 130 and delivered to the one or more motors or engines via one or more fluid conduits, such as piping. In some implementations, the power system 234 may be implemented in whole or in part on the ground station 110.

As noted, the aerial vehicle 130 may include the power generation/conversion components 236. The power generation/conversion components 236 could take different forms in different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 130 may include a communication system 238. The communication system 238 may take the form of or be similar in form to the communication system 218. The aerial vehicle 130 may communicate with the ground station 110, other aerial vehicles, and/or other entities (e.g., a command center) via the communication system 238.

In some implementations, the aerial vehicle 130 may be configured to function as a "hotspot," or in other words, as a gateway or proxy between a remote support device (e.g., the ground station 110, the tether 120, other aerial vehicles) and one or more data networks, such as a cellular network and/or the Internet. Configured as such, the aerial vehicle 130 may facilitate data communications that the remote support device would otherwise be unable to perform by itself.

For example, the aerial vehicle 130 may provide a WiFi connection to the remote device, and serve as a proxy or gateway to a cellular service provider's data network, which the aerial vehicle 130 might connect to under an LTE or a 3G protocol, for instance. The aerial vehicle 130 could also serve as a proxy or gateway to other aerial vehicles or a command station, which the remote device might not be able to otherwise access.

As noted, the aerial vehicle 130 may include the one or more processors 242, the program instructions 246, and the data storage 244. The one or more processors 242 can be configured to execute computer-readable program instructions 246 that are stored in the data storage 244 and are executable to provide any of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 130 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 130 and/or at least one entity remotely located from the aerial vehicle 130, such as the ground station 110. Generally, the manner in which the control system 248 is implemented may vary, depending upon the particular application.

While the aerial vehicle 130 has been described above, it should be understood that the methods and systems described herein could involve any suitable aerial vehicle that is connected to a tether, such as the tether 120.

Figure 3:
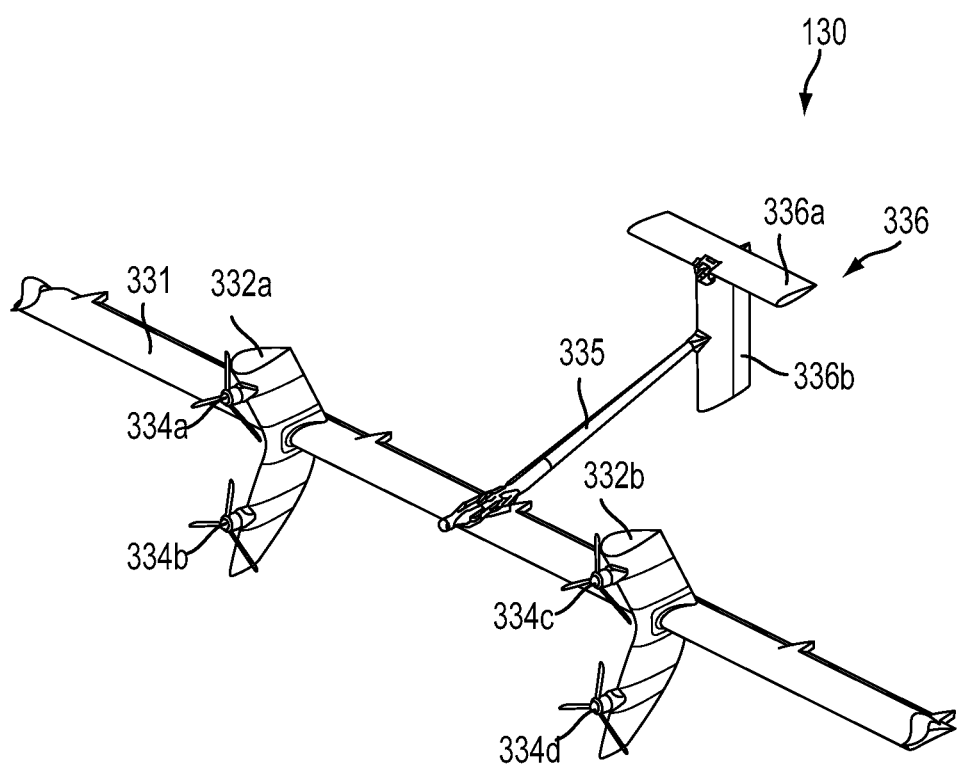
FIG. 3 depicts an aerial vehicle, according to an example embodiment.

FIG. 3 depicts the aerial vehicle 130, according to an example embodiment. In particular, the aerial vehicle 130 may include a main wing 331, pylons 332a and 332b, rotors 334a, 334b, 334c, and 334d, a tail boom 335, and a tail wing assembly 336. Any of these components may be shaped in any form which allows for the use of components of lift to resist gravity and/or move the aerial vehicle 130 forward.

The main wing 331 may provide a primary lift force for the aerial vehicle 130. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 130 and/or reduce drag on the aerial vehicle 130 during hover flight, forward flight, and/or crosswind flight.

The main wing 331 and pylons 332a and 332b may be any suitable material for the aerial vehicle 130 to engage in hover flight, forward flight, and/or crosswind flight. For example, the main wing 331 and pylons 332a and 332b may include carbon fiber and/or e-glass, and include internal supporting spars or other structures. Moreover, the main wing 331 and pylons 332a and 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a and 332b may connect the rotors 334a, 334b, 334c, and 334d to the main wing 331. In some examples, the pylons 332a and 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust for the aerial vehicle 130 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 130 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 130. In such implementations, the tail boom 335 may carry a payload.

The tail wing 336a and/or the vertical stabilizer 336b may be used to stabilize the aerial vehicle 130 and/or reduce drag on the aerial vehicle 130 during hover flight, forward flight, and/or crosswind flight. For example, the tail wing 336a and/or the vertical stabilizer 336b may be used to maintain a pitch of the aerial vehicle 130 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 130.

While the aerial vehicle 130 has been described above, it should be understood that the systems and methods described herein could involve any suitable aerial vehicle that is connected to an airborne wind turbine tether, such as the tether 120.

Figure 4:
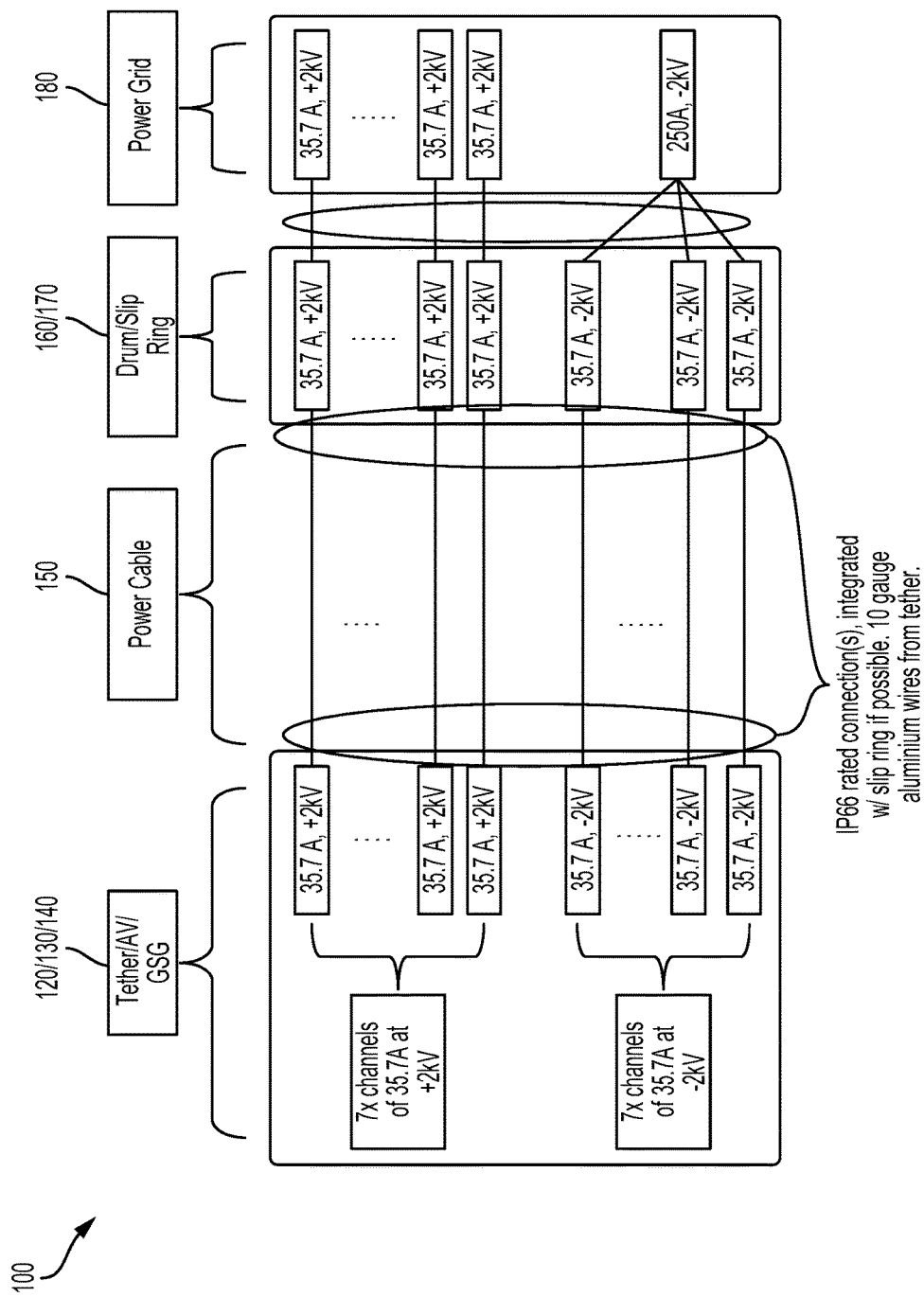
FIG. 4 is a simplified block diagram of an AWT, according to an example embodiment.

FIG. 4 includes another simplified block diagram of the AWT 100. FIG. 4 shows the aerial vehicle (AV) 130 represented in a consolidated block with the tether 120 and a GSG (ground side gimbal) 140. FIG. 4 also depicts a power cable 150, a drum 160 and a slip ring 170 in a consolidated block, and a power grid 180.

As shown, the aerial vehicle 130 may generate or receive any number of channels (e.g., 14 channels) of electrical power. Each channel may have a direct current of about 35.7 A at +1-2 kV. The aerial vehicle 130 may generate or receive power in other forms as well, including different polarities, voltages, currents etc.

Figure 6:
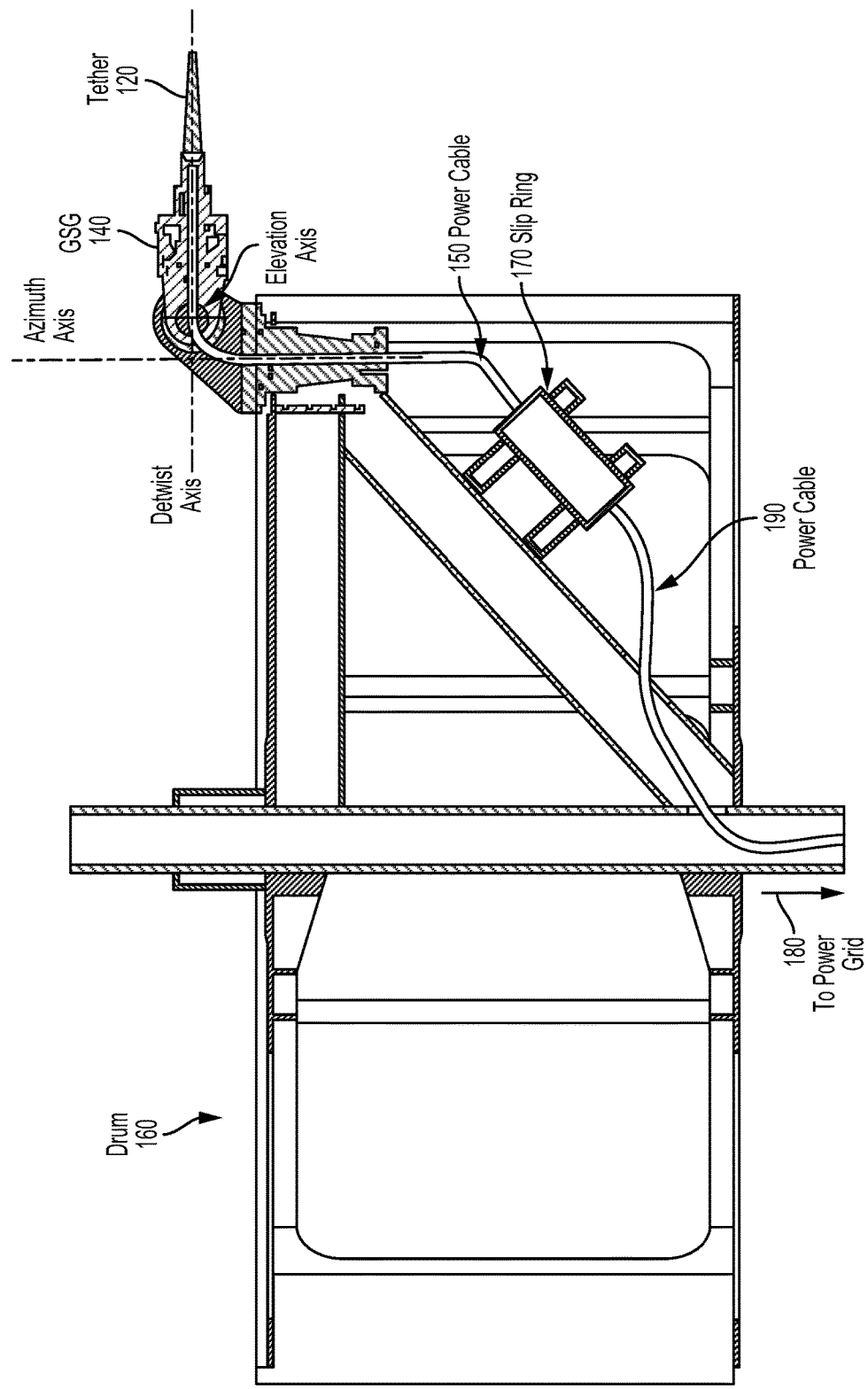
FIG. 6 depicts power cables and other components of an AWT, according to an example embodiment.

The GSG 140 (shown in more detail in FIG. 6) may secure the tether 120 as it enters the ground station 110 at a desired entry point and may further allow the tether 120 to move with respect to an elevation axis and an azimuth axis (see FIG. 6). The GSG 140 may also allow the tether 120 to freely twist or rotate around a detwist axis, that is, the longitudinal axis of the tether 120 (see FIG. 6).

Though described herein separately, the power cable 150 and the tether 120 may be a single unitary element. That is, the tether 120 may include any of the features described herein that facilitate the transmission of significant amounts of electrical power concurrent with transferring torque or relieving torsion that builds up along the tether 120 to rotate the slip ring 170. Preferably, however, the power cable 150 may be an extension of the tether 120 or be coupled to the tether 120. As shown in FIG. 4, the power cable 150 may include multiple insulated conductors that correspond respectively to the channels of power generated or received by the aerial vehicle 130. That is, insulated conductors of the power cable 150 may be electrically coupled to a respective conductor of the tether 120. (But, as noted above, the power cable 150 may simply be an extension of the tether 120.)

The tether 120 may be coupled, at or near the GSG 140, to the power cable 150 at a first end of the power cable 150. A second end of the power cable 150 may be coupled to the slip ring 170 that may be housed within the drum (e.g., a winch drum) 160. The drum 160 may be used to reel in or reel out the tether 120 in various situations. The power cable 150 may electrically couple the aerial vehicle 130 and the tether 120 to the slip ring 170. Multiple conductors of the power cable 150 may be coupled to respective conductors that are attached to a rotatable portion of the slip ring, thus facilitating transmission of multiple channels of power from the aerial vehicle 130 to the slip ring 170. The power cable 150 may be approximately 2 meters long, may have a minimum bend radius at least as low as 160 mm (or even 120 mm or smaller), may be configured to provide at least 5 to 10 N·m of torque to the rotatable portion of the slip ring 170, and may be configured for bidirectional torque transfer (CCW), but other examples are possible. The conductors of the power cable 150 may include ten gauge aluminum wires, however other examples are possible.

The slip ring 170 may include a rotatable portion and a stationary portion. The power cable 150 may be coupled to the rotatable portion of the slip ring 170 to relieve twisting or torsion of the power cable 150 caused by closed-loop flight of the aerial vehicle 130. As the aerial vehicle 130 makes revolutions in the air that cause the tether 120 and/or the power cable 150 to twist, the power cable 150 may relieve this torsion by untwisting and causing the rotatable portion of the slip ring 170 to rotate. The slip ring 170 may include integrated IP66 rated connections for coupling to the power cable 150. The rotatable portion or the stationary portion of the slip ring 170 may include a metal brush or similar features that maintain an electrical contact between the stationary portion and the rotatable portion of the slip ring 170 as the rotatable portion of the slip ring 170 rotates. As such, the power that is generated by the aerial vehicle 130 may travel down the tether 120, through the power cable 150, through the slip ring 170, and into the power grid 180, and/or vice-versa. Similarly, electrical and/or optical control signals may also travel between the aerial vehicle 130 and the slip ring 170.

The power grid 180 may be electrically coupled to the stationary portion of the slip ring 170 via a power cable 190 shown in FIG. 6. The power cable 190 may be about 20 meters long, but other examples are possible. The power cable 190 may be capable of bidirectional torque transfer and/or bidirectional power transfer and have any or all features that the power cable 150 may have. The power grid 180 may be an electrical power transmission network as is known in the art.

Figure 5:
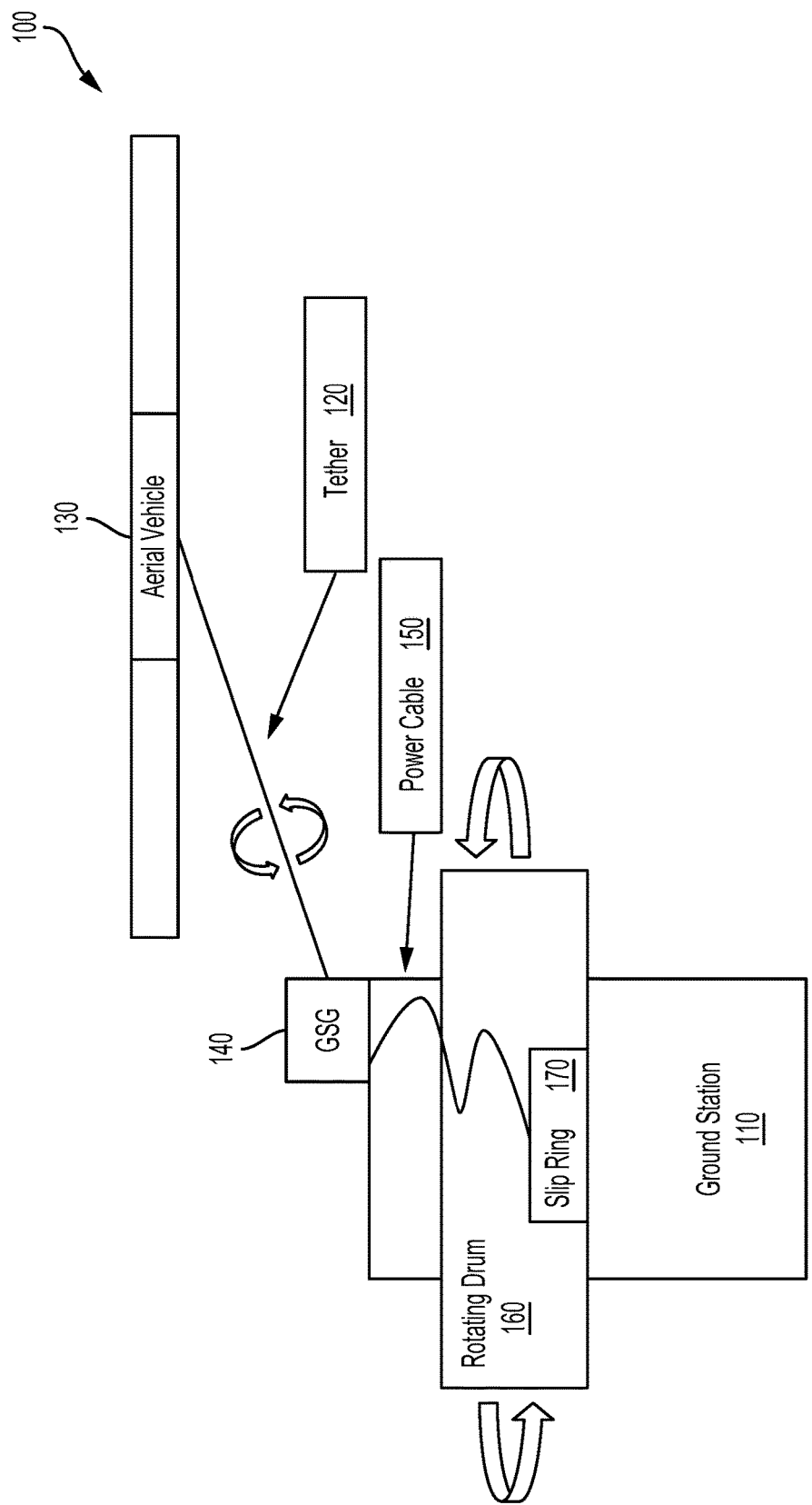
FIG. 5 is another simplified block diagram of an AWT, according to an example embodiment.

FIG. 5 and FIG. 6 provide additional depictions of the AWT 100.

Figure 7:
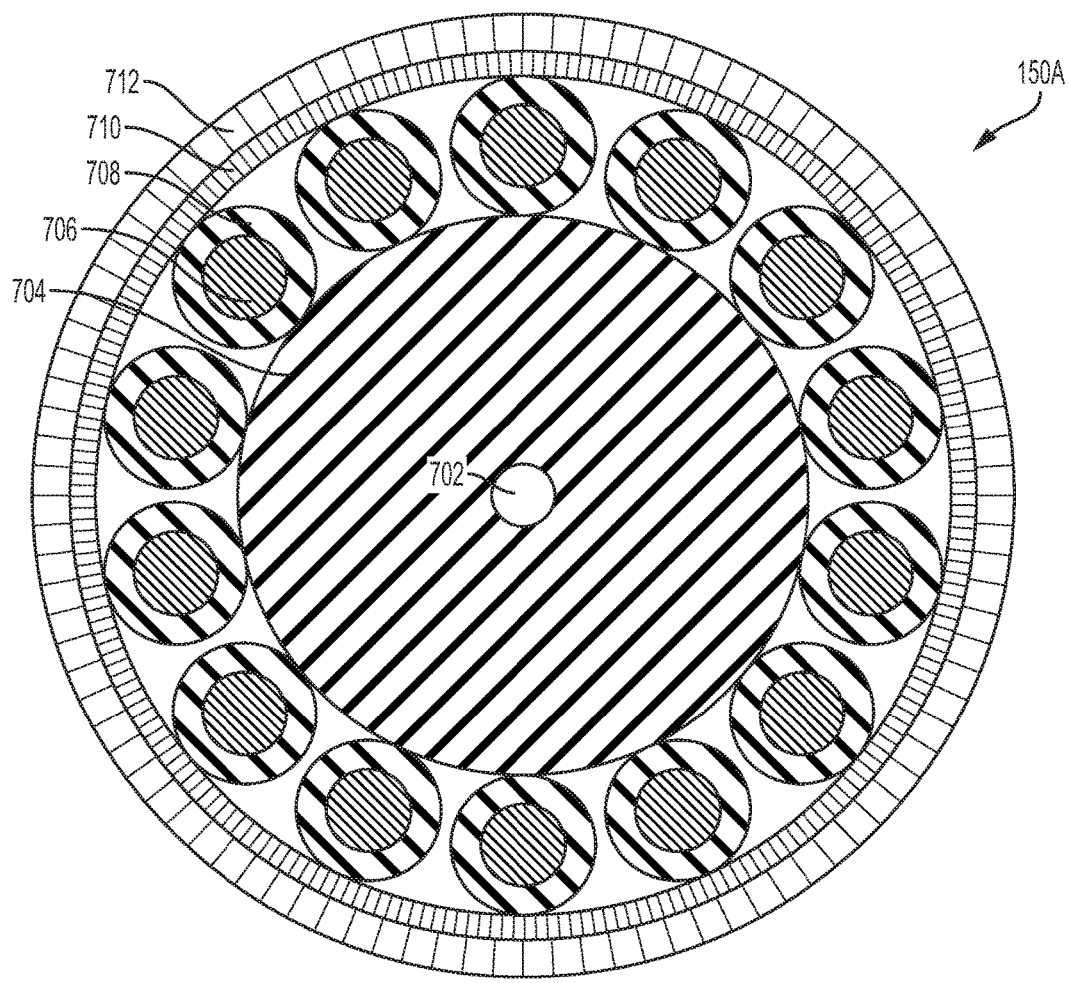
FIG. 7 is a cross section of a power cable, according to an example embodiment.

FIG. 7 is a cross-sectional view of a power cable 150A. In some examples, the power cable 150 of FIGS. 4-6 may take the form of the power cable 150A. The power cable 150A may include a fiber optic line 702, an insulating core 704, a conductor 706, an insulator 708, an insulating sheath 710, and an insulating jacket 712. The power cable 150A may have a minimum bend radius that is less than or equal to 120 mm. The outer diameter of the power cable 150A may be 1.5 inches (38.1 mm), but other examples are possible.

The fiber optic line 702 may include one or more optical fibers as is known in the art. The fiber optic line 702 may be used to transmit information between the aerial vehicle 130 and the ground station 110. It may be advantageous to place the fiber optic line 702 at or near the center of the power cable 150A to facilitate a smaller bend radius of the power cable 150A. The fiber optic line 702 may be embedded along the longitudinal axis of the insulating core 704, for example. The insulating core 704 may take the form of a 70 A durometer silicone core having an outer diameter of about 1 inch. Other examples are possible.

The conductor 706 may be a 10 American Wire Gauge (AWG) metal wire made up of 105 strands of 30 AWG tinned copper. The power cable 150A may include 14 total conductors similar to the conductor 706 that surround the perimeter of the insulating core 704 in a helical wrap. The conductor 706 may be rated for 15 kV DC and have a 110 mm pitch length (e.g., a 37.5 degree pitch with respect to the longitudinal axis of the power cable 150A). The power cable 150A may be able to handle up to 30 A of current per conductor.

The insulator 708 may surround the conductor 706 to form an insulated conductor. As such, the power cable 150A may include 14 total insulated conductors that surround the perimeter of the insulating core 704. The insulator 708 may be made of silicone. The insulated conductors may have an outer diameter of 5.5 mm and be rated for 15 kV DC. The insulated conductors may be pitched at about 37.5° with respect to a longitudinal axis of the power cable 150A. The insulator 708 may be about 1.1 mm thick along the radius of the corresponding insulated conductor.

The insulating sheath 710 may be abrasion resistant heat shrink fabric. Experiments have shown that an insulating sheath such as the insulating sheath 710 may, on its own, be a poor torsion relieving component and/or a poor torque transferring component. But, the insulating sheath 710 may be useful in preventing the power cable 150A from hockling (e.g., wrapping up on itself).

The insulating jacket 712 may be designed to bear and relieve at least a portion of the torsion and/or twisting forces that the power cable 150A may experience. The insulating jacket 712 may be a braided Nomex jacket which is slid over the insulating sheath 710, thereby reducing the torsional load on the insulated conductors (e.g., the conductor 706). Braids or fibers of the insulating jacket 712 may be pre-loaded (twisted) and lay at about a 45° angle with respect to the longitudinal axis of the power cable 150A. The insulating jacket 712 may be approximately 1/16 of an inch thick along the radius of the power cable 150A. With the insulating jacket 712, the power cable 150A may have a torsional strength of at least 85 N·m. The insulating jacket 712 may be a good torque transfer component, especially if the insulating jacket 712 is pre-loaded (e.g., twisted) prior to being placed on the power cable 150A. The insulating jacket 712 may be additionally useful for preventing the insulating sheath 710 from hockling.

After 1000 rotational cycles at 7 N·m and a 150 mm bend radius, the power cable 150A should exhibit intact insulation, pass a 6 kV DC Hipot test, exhibit intact conductors (according to visual inspection), and exhibit little or no signs of wear on the insulating jacket 712. The power cable 150A should function properly at temperatures between −30° C. to 70° C. The power cable 150A should function properly at a bend radius as small as 100 mm when the power cable 150A is not subject to torsion, or a bend radius as small as 150 mm when the power cable 150A is subject to torsion. It is acknowledged that the lifespan of the power cable 150A may decrease with decreasing bend radius and/or increased torsion loads.

FIG. 8 depicts various additional views of the power cable 150A. In the upper left hand view, a cable grip 802 is shown clasping the power cable 150A for testing purposes. In the upper right hand view, a twisting tool 804 is shown. The twisting tool 804 may be used as a tool for pre-loading or twisting conductors around the insulating core 704 to form the power cable 150A. The twisting tool 804 may include a sun gear and a planetary gear that are sandwiched between two aluminum plates with spaces for the conductors. In the lower left hand view, a cross sectional view of the power cable 150A is shown. In the lower right hand view, a cut away view of the power cable 150A is shown.

Figure 9A:
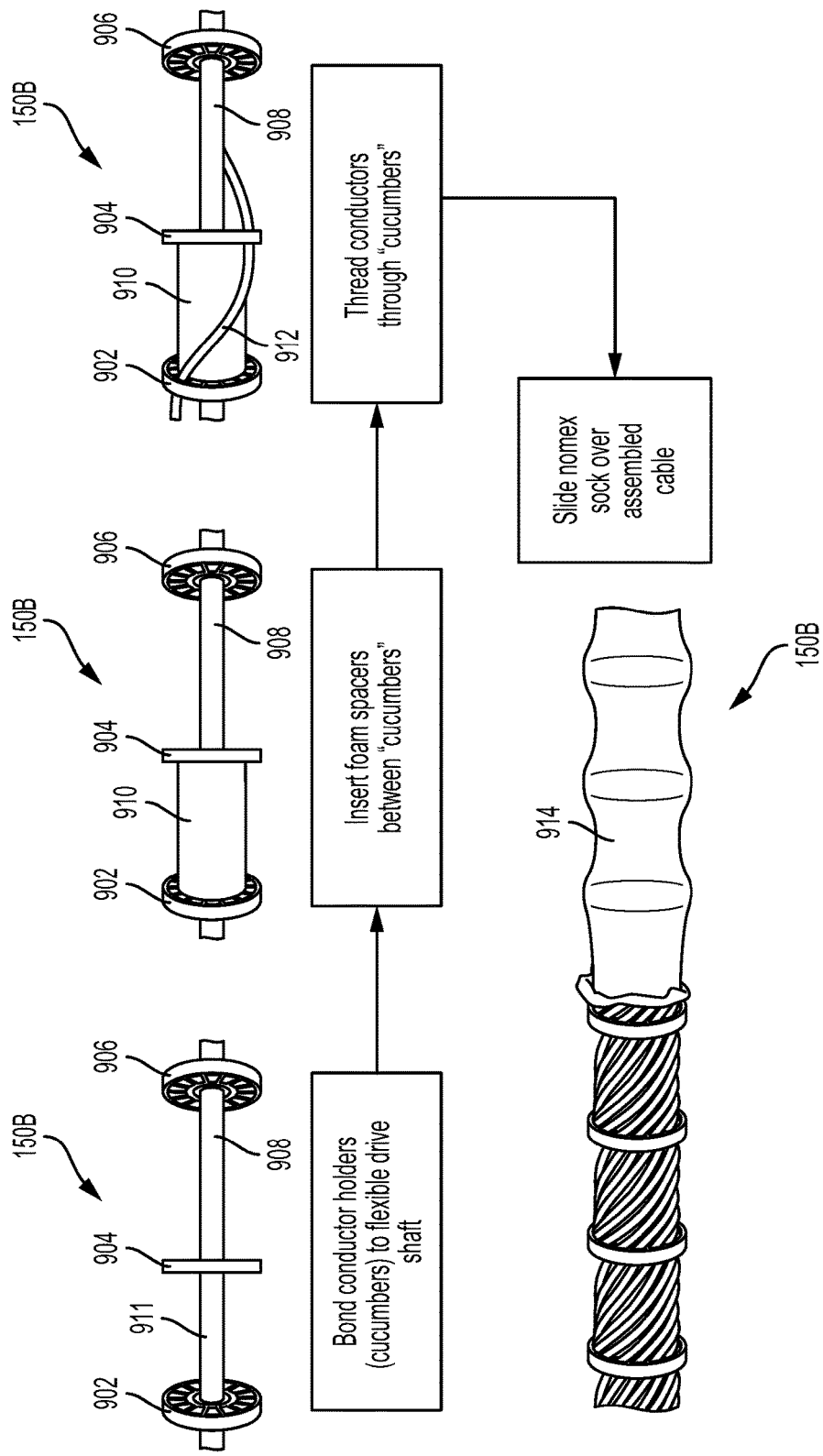
FIG. 9A depicts the assembly of another power cable, according to an example embodiment.

FIG. 9A shows steps for assembling another power cable 150B. The power cable 150B may include a conductor guide (e.g., a conductor holder or a "cucumber") 902, a conductor guide 904, a conductor guide 906, a flexible drive shaft 908, an insulating spacer (e.g., foam) 910, an insulated conductor 912, and an insulating jacket (e.g., a "nomex sock") 914.

The conductor guides 902-906 may be placed onto the flexible drive shaft 908 by inserting the flexible drive shaft 908 through axial receiving holes of the respective conductor guides 902-906. The flexible drive shaft 908 may be bonded to the conductor guides 902-906 via mechanical means, epoxy or another adhesive, or other means. The conductor guides 902-906 may be made of plastic, ceramic, or other electrically insulating materials and may each include an axial receiving hole for receiving the flexible drive shaft 908 and multiple distal receiving holes for receiving insulated conductors such as the insulated conductor 912. The conductor guides 902-906 may be spaced at approximately 2 inch intervals along the flexible drive shaft 908, and have a 1.75 inch outer diameter. The conductor guides 902-906 may be formed of rigid or hard material that is configured to transfer azimuthal rotational forces (e.g., resulting from twisting of the power cable 150B) along the longitudinal axis of the power cable 150B.

The flexible drive shaft 908 may reside at the longitudinal axis of the power cable 105B, have an outer diameter of about ½ inch, and be about 6 feet long. The flexible drive shaft 908 may take other forms as well. The flexible drive shaft may include a plurality of (e.g., metal) wires and an insulating material that collectively surrounds the plurality of wires.

The insulating spacer 910 may be placed between the conductor guides 902 and 904 and surround that portion of the flexible drive shaft 908. The insulating spacer 910 may be made of pipe insulation foam or other insulating materials. The insulating spacer 910 may be useful for keeping insulated conductors (e.g., the insulated conductor 912) at a relatively constant radial distance from the flexible drive shaft 908. The insulating spacer 910 may have a hollow core and an inner diameter of ½ inch and a ⅜ inch radial thickness. The insulating spacer 910 may take other forms as well. The power cable 150B may include insulating spacers in addition to the insulating spacer 910. For example, insulating spacers may be placed between each conductor guide and a neighboring conductor guide.

The insulated conductor (e.g., an insulated wire) 912 may be fed through a distal receiving hole of the conductor guide 902, a distal receiving hole of the conductor guide 904, and a distal receiving hole of the conductor guide 906. The insulated conductor 912 and other insulated conductors may be fed through distal receiving holes that are at different azimuthal positions, such that each insulated conductor is pitched or twisted (e.g., a 2 to 6 inch helical pitch or a 4 inch helical pitch). The insulated conductors may extend 3 feet past each end of the flexible drive shaft 908 to allow sufficient excess length to make connections with other components. The power cable 150B may include 14 silicone insulated finely stranded 10 AWG conductors rated for 36 Amps/4 kV DC (or 6 kV DC). Each conductor may include 105 tin coated copper wires with an outer diameter of 4.572 mm (including insulation). The insulated conductor 912 and other conductors may twist around the insulating spacer 910 and the flexible drive shaft 908.

The insulating jacket 914 may be placed over multiple conductor guides, the flexible drive shaft 908, multiple spacers, and multiple (e.g., twisted) insulated conductors as shown in FIG. 9A. Fibers of the insulating jacket 914 may be knit together, braided, woven, wound (e.g., wound into a pattern) or the like. The insulating jacket 914 may hold the insulated conductors within a "protective envelope" established by the conductor guides 902-906.

Figure 9B:
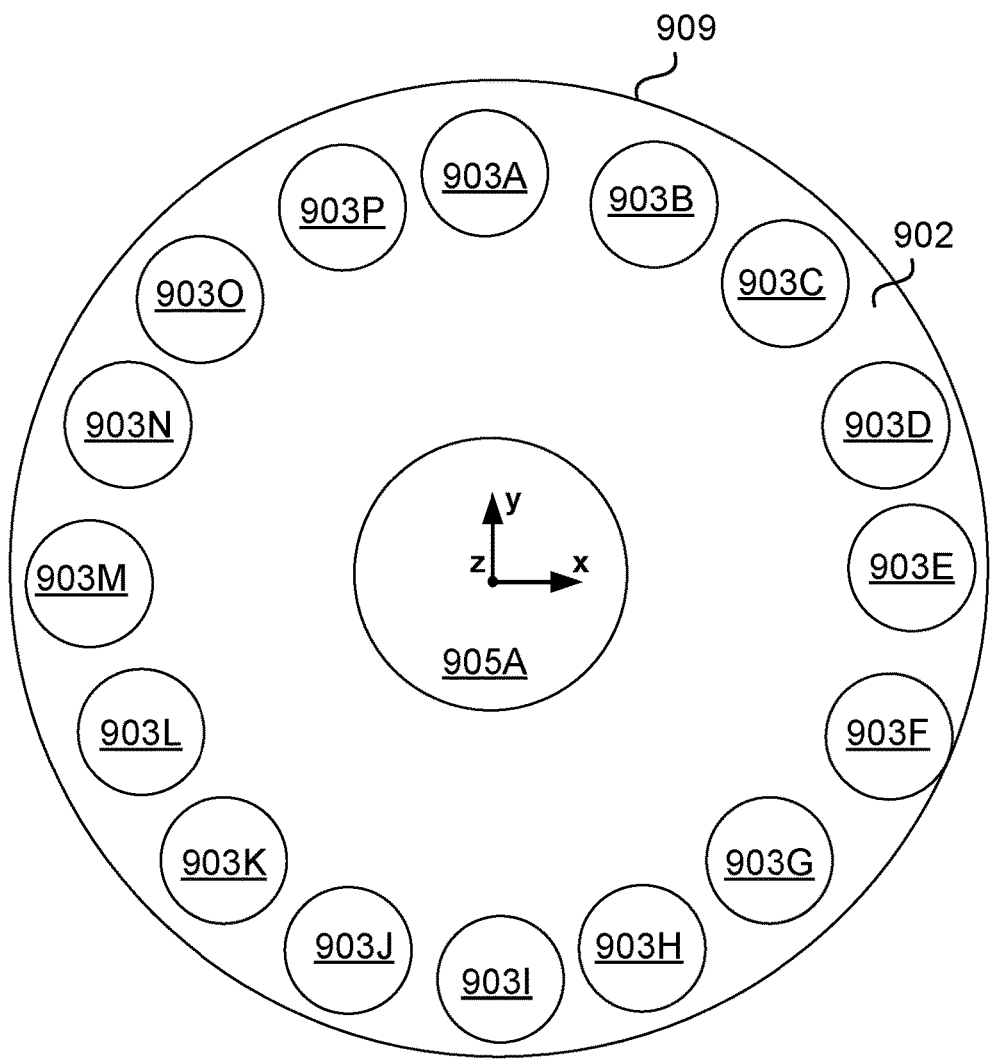
FIG. 9B depicts a conductor guide, according to an example embodiment.

FIG. 9B is a side view of the conductor guide 902. The conductor guide 902 may include plastic, ceramic, or other rigid insulating materials. The "z" axis shown in FIG. 9B may be what is referred to herein as the "longitudinal axis" of the power cable 150B, the conductor guide 902, or the conductor guide 904. The conductor guide 902 may include distal receiving holes 903A, 903B, 903C, 903D, 903E, 903F, 903G, 903H, 903I, 903J, 903K, 903L, 903M, 903N, 903O, and 903P arranged near the perimeter 909 of the conductor guide 902. The conductor guide 902 may further include an axial receiving hole 905A. Each of the distal receiving holes 903A-P may be positioned at a common radial distance from the axial receiving hole 905A.

Figure 9C:
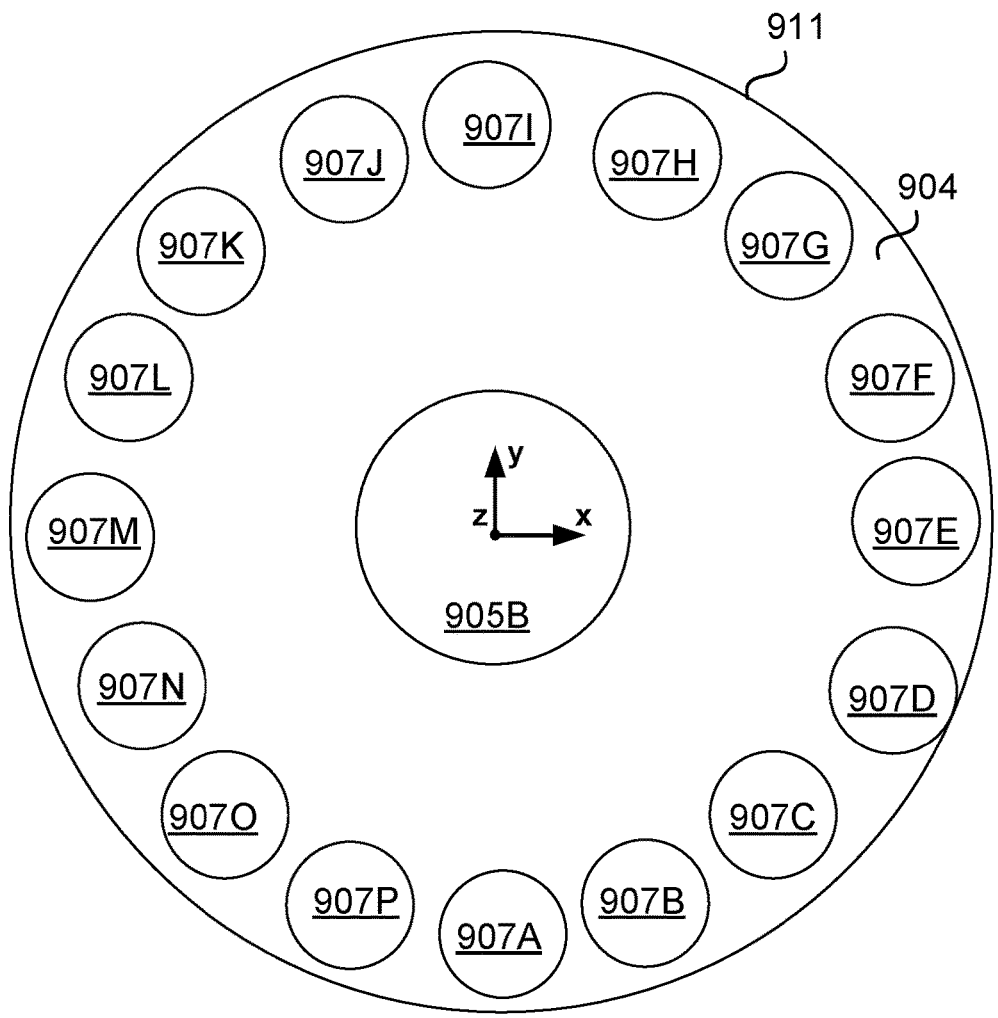
FIG. 9C depicts a conductor guide, according to an example embodiment.

FIG. 9C is a side view of the conductor guide 904. The conductor guide 904 may include plastic, ceramic, or other rigid insulating materials. The conductor guide 904 may include distal receiving holes 907A, 907B, 907C, 907D, 907E, 907F, 907G, 907H, 907I, 907J, 907K, 907L, 907M, 907N, 907O, and 907P arranged near the perimeter 911 of the conductor guide 904. The conductor guide 904 may further include an axial receiving hole 905B. Each of the distal receiving holes 907A-P may be positioned at a common radial distance from the axial receiving hole 905B.

To recap, the power cable 150B may include a conductor guide 902 that includes (i) distal receiving holes 903A-P and (ii) an axial receiving hole 905A on a longitudinal axis "z" of the power cable 150B. The power cable 150B may also include a conductor guide 904 that includes (i) distal receiving holes 907A-P and (ii) an axial receiving hole 905B on the longitudinal axis "z." The power cable 150B may further include a flexible drive shaft 908 that is disposed in the axial receiving hole 905A and the axial receiving hole 905B and conductors (e.g., similar to the conductor 912) that twist around the longitudinal axis "z." The conductors (e.g., the conductor 912) may be disposed in respective distal receiving holes 903A-P and in respective distal receiving holes 907A-P.

These conductors may continue to be routed through successive conductor guides, twisting around the flexible drive shaft 908 in a wound pattern as the conductors extend along the longitudinal axis of the power cable 150B.

As shown when comparing FIG. 9B to FIG. 9C, the distal receiving hole 903A may be at an azimuthal position that is different from an azimuthal position of the distal receiving hole 907A (e.g., approximately 180 degrees of azimuthal offset). In other examples, the distal receiving hole 903A might be azimuthally offset from the distal receiving hole 907A within a range of 135 degrees to 225 degrees. Other examples are possible.

In various embodiments, conductors of the power cable 150B each make less than one full revolution around the longitudinal axis of the power cable 150B between adjacent conductor guides of the power cable 150B. In other embodiments, the conductors of the power cable can make exactly one full revolution or more than one full revolution around the longitudinal axis of the power cable between adjacent conductor guides of the power cable.

Figure 10:
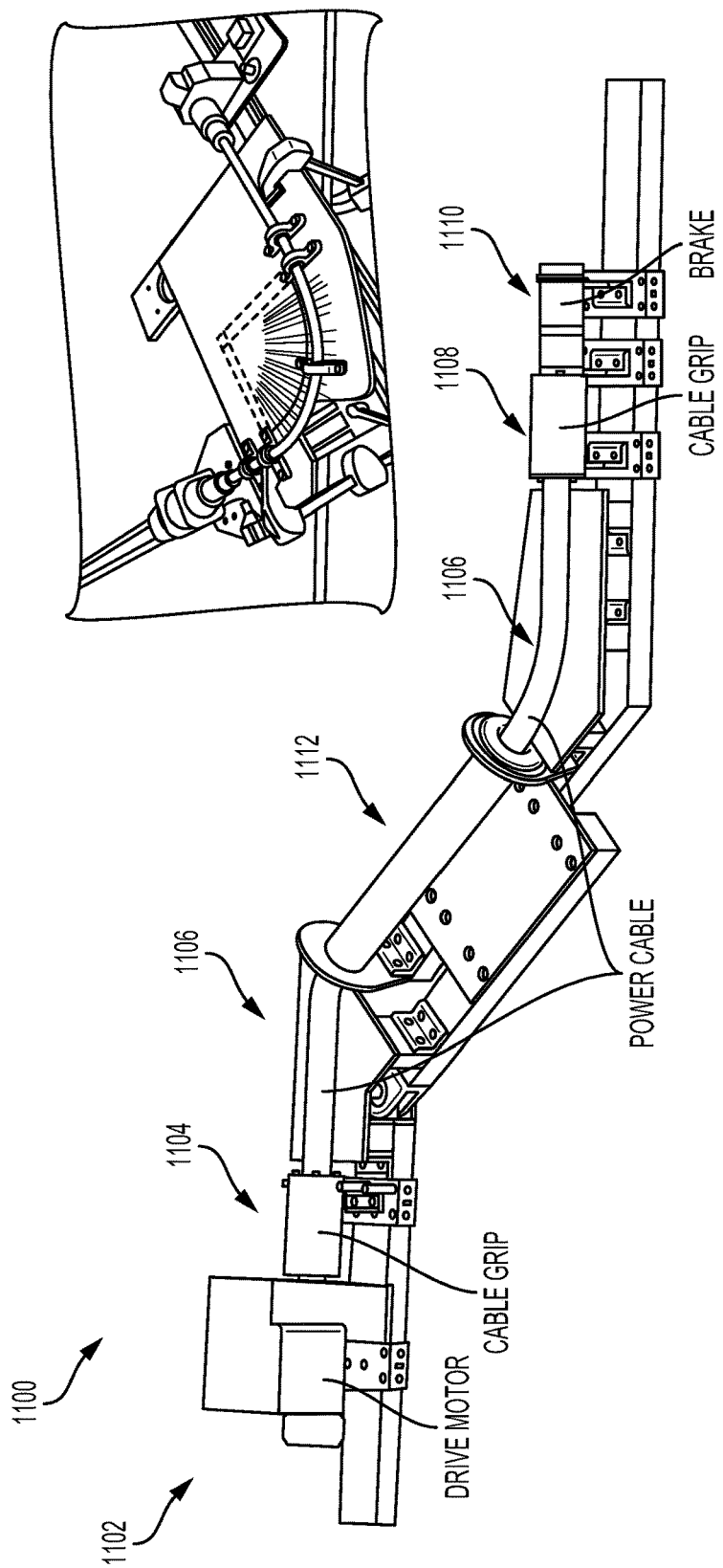
FIG. 10 depicts a test fixture, according to an example embodiment.

FIG. 10 depicts a test fixture 1100 which may be used to test the performance, failure modes, and/or torque transfer capabilities of power cables such as the power cables 150A, 150B, and 150C. The test fixture 1100 may be used to determine a minimum bend radius of the power cable, which part(s) of the power cable are most likely to fail, and/or how many rotational cycles the power cable might undergo before failure. The text fixture 1100 may include a drive motor 1102, a cable grip 1104, a power cable 1106, a guide tube 1112, a cable grip 1108, and a brake 1110.

A power cable 1106, such as the power cables 150A-C, may be fed through the guide tube 112. The guide tube 1112 may be positioned to simulate at least some of the bends, twists, and forces that the power cable 1106 may experience when used as part of an AWT that is generating power. The guide tube 1112 may take various forms to simulate various operating conditions and bend radii for the power cable 1106 under test.

The drive motor 1102 may apply a rotational force to the power cable 1106 via the cable grip 1104. The cable grip 1104 may clasp or otherwise be secured to the power cable 1106. The rotational force may be directed around the longitudinal axis of the power cable 1106 and may simulate the force applied to the power cable 1106 by the aerial vehicle 130 as the aerial vehicle 130 makes revolutions in the air.

The brake 1110 and the cable grip 1108 may apply a rotational force to the power cable 1106 that simulates the rotational inertia of the slip ring 170. That is, the rotational force applied to the power cable 1106 by the brake 1110 and the cable grip 1108 may tend to resist the rotational force applied by the drive motor 1102 and the cable grip 1104. In this way, the test fixture 1100 may be used to determine whether the power cable 1106 is suitable for overcoming the rotational inertia of the slip ring 170. For example, in a successful test the power cable 1106 may transfer the torsion the power cable 1106 bears to overcome the force applied by the brake 1110 without undesirable deformation or rupture of the power cable 1106. In an unsuccessful test, the power cable 1106 may kink, break, or otherwise fail.

Figure 11:
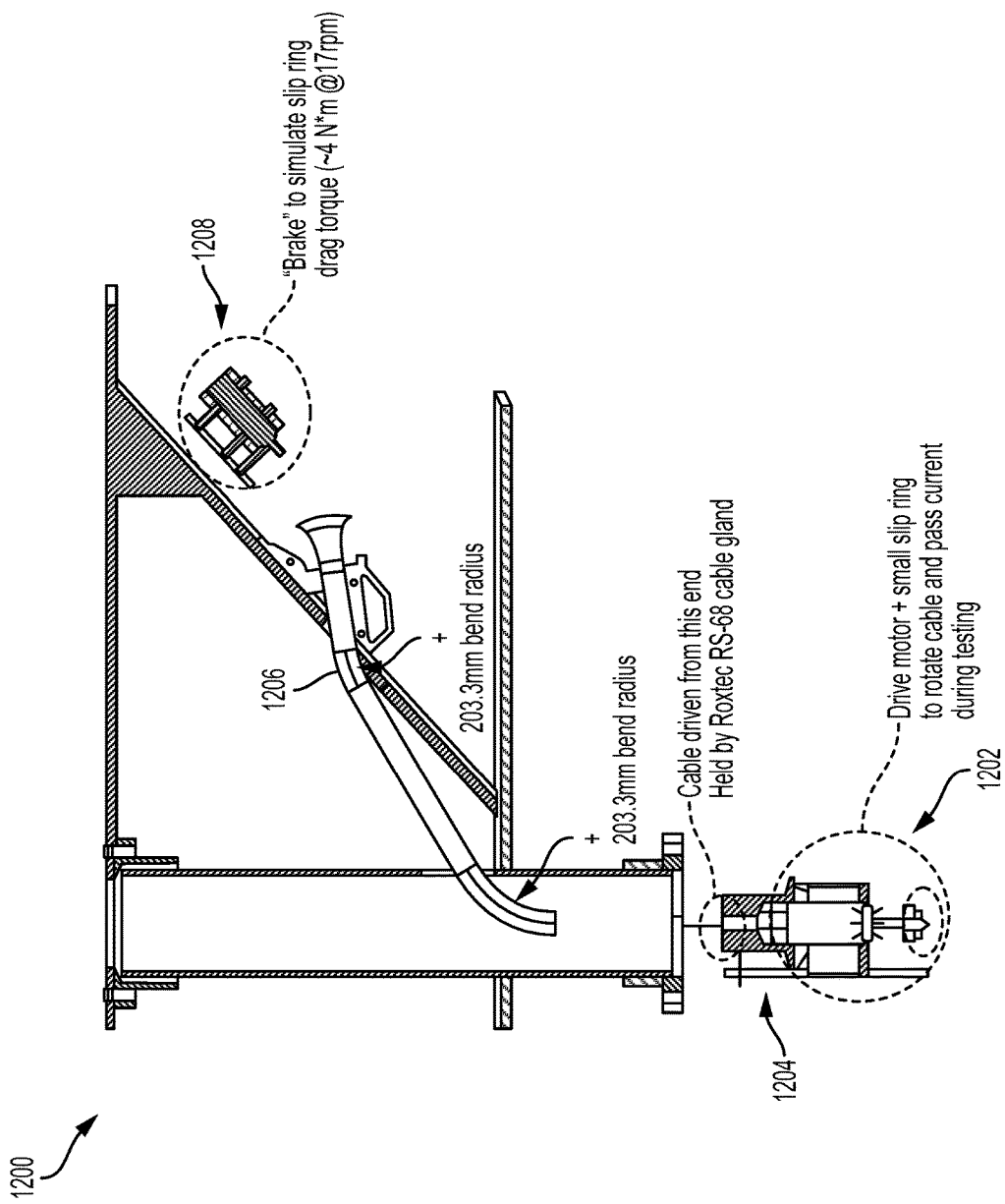
FIG. 11 depicts another test fixture, according to an example embodiment.

FIG. 11 depicts another text fixture 1200. The text fixture 1200 may be used for purposes similar to those for which the text fixture 1100 may be used. The text fixture 1200 may include a drive motor 1202, a cable grip 1204, a guide tube 1206, a brake 1208, and a cable grip (not shown) corresponding to the brake 1208. The drive motor 1202 may function similarly to the drive motor 1102. The cable grip 1204 may function similarly to the cable grip 1104. The guide tube 1206 may function similarly to the guide tube 1106 and be configured to allow a power cable (not shown) to pass through the guide tube 1206 and be rotated within the guide tube 1206 while experiencing bending stresses. The brake 1208 may function similarly to the cable grip 1108 and/or the brake 1110. The geometry of the guide tube 1206 may closely resemble the bends and twists that a power cable will experience during actual operation conditions.

Figure 12:
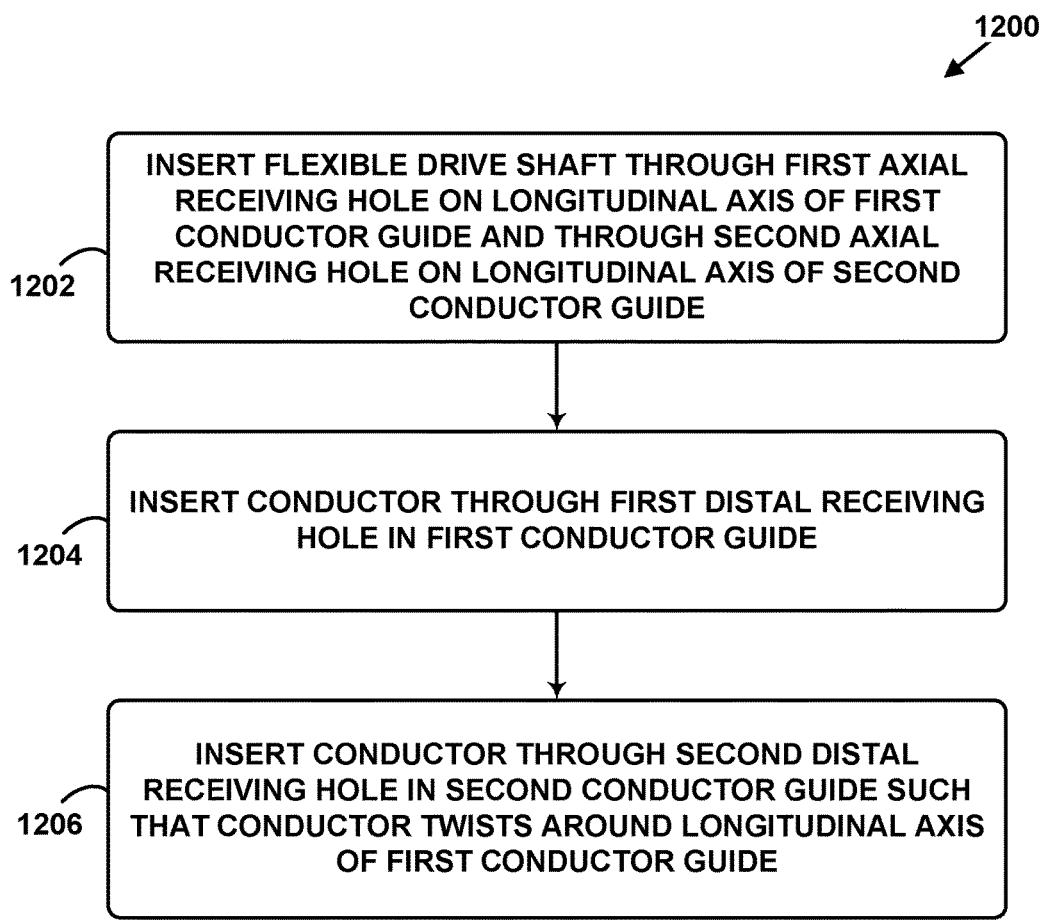
FIG. 12 is a block diagram depicting a method, according to an example embodiment.

FIG. 12 is a block diagram of the method 1200 for forming a power cable (e.g., the power cable 150B).

At block 1202, the method 1200 includes inserting a flexible drive shaft through a first axial receiving hole on a longitudinal axis of a first conductor guide and through a second axial receiving hole on a longitudinal axis of a second conductor guide.

Referring to FIGS. 9A, 9B, and 9C, the flexible drive shaft 908 may be inserted through the axial receiving hole 905A on the longitudinal axis "z" of the conductor guide 902 and through the axial receiving hole 905B on the longitudinal axis "z" of the conductor guide 904.

At block 1204, the method 1200 includes inserting a conductor through a first distal receiving hole in the first conductor guide.

For example, the conductor 912 may be inserted through the distal receiving hole 903A in the conductor guide 902.

At block 1206, the method 1200 includes inserting the conductor through a second distal receiving hole in the second conductor guide such that the conductor twists around the longitudinal axis of the first conductor guide.

For example, the conductor 912 may be inserted through the distal receiving hole 907A in the conductor guide 904 such that the conductor 912 twists around the longitudinal axis "z" of the conductor guide 902 and/or the conductor guide 904.

The method 1200 may also involve placing the insulating spacer 910 between the conductor guide 902 and the conductor guide 904 and between the flexible drive shaft 908 and the conductor 912. The insulating spacer 910 may surround at least a portion of the flexible drive shaft 908 that is between the conductor guide 902 and the conductor guide 904. The conductor 912 may twist around the insulating spacer 910.

The method 1200 may also involve placing the insulating jacket 914 such that the insulating jacket 914 surrounds the conductor guide 902, the conductor guide 904, the flexible drive shaft 908, and/or the conductor 912.

The method 1200 may also involve bonding (e.g., mechanically via fasteners or adhesively) the flexible drive shaft 908 to the conductor guide 902 and/or the conductor guide 904.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A power cable comprising:
    a first conductor guide comprising (i) a first distal receiving hole and (ii) a first axial receiving hole on a longitudinal axis of the power cable;
    a second conductor guide comprising (i) a second distal receiving hole and (ii) a second axial receiving hole on the longitudinal axis;
    a flexible drive shaft that is disposed in the first axial receiving hole and the second axial receiving hole; and
    a conductor that twists around the longitudinal axis, wherein the conductor is disposed in the first distal receiving hole and the second distal receiving hole.

2. The power cable of claim 1, wherein the first distal receiving hole is at an azimuthal position that is different from an azimuthal position of the second distal receiving hole.

3. The power cable of claim 2, wherein the azimuthal position of the first distal receiving hole differs from the azimuthal position of the second distal receiving hole by an angle within a range of 135 degrees to 225 degrees.

4. The power cable of claim 1, wherein the first conductor guide comprises a plurality of distal receiving holes that include the first distal receiving hole, wherein each distal receiving hole of the plurality of distal receiving holes is positioned at a common radial distance from the first axial receiving hole.

5. The power cable of claim 1, wherein the first conductor guide or the second conductor guide comprises an electrically insulating material.

6. The power cable of claim 1, wherein the first conductor guide or the second conductor guide comprises plastic or a ceramic material.

7. The power cable of claim 1, wherein the power cable is configured to transfer azimuthal torque of at least 5 newton-meters along the longitudinal axis of the power cable between a first end of the power cable and a second end of the power cable.

8. The power cable of claim 7, wherein the first end of the power cable and the second end of the power cable are at least six feet apart.

9. The power cable of claim 8, wherein the conductor is rated to carry at least 36 amps DC.

10. The power cable of claim 1, wherein the conductor makes less than one full revolution around the longitudinal axis between the first conductor guide and the second conductor guide.

11. The power cable of claim 1, wherein the flexible drive shaft comprises:
a plurality of wires; and
an insulating material that collectively surrounds the plurality of wires.

12. The power cable of claim 1, further comprising an insulating spacer between the first conductor guide and the second conductor guide and between the flexible drive shaft and the conductor, wherein the insulating spacer surrounds at least a portion of the flexible drive shaft that is between the first conductor guide and the second conductor guide, and wherein the conductor twists around the insulating spacer.

13. The power cable of claim 12, wherein the insulating spacer comprises foam insulation.

14. The power cable of claim 1, further comprising an insulating jacket that surrounds the conductor and the flexible drive shaft.

15. The power cable of claim 14, wherein the insulating jacket also surrounds the first conductor guide.

16. The power cable of claim 1, wherein the conductor twists with a helical pitch within a range of about 2 inches to 6 inches.

17. The power cable of claim 1, wherein the flexible drive shaft is bonded to the first conductor guide.

18. A method of forming a power cable, the method comprising:
inserting a flexible drive shaft through a first axial receiving hole on a longitudinal axis of a first conductor guide and through a second axial receiving hole on a longitudinal axis of a second conductor guide;
inserting a conductor through a first distal receiving hole in the first conductor guide; and
inserting the conductor through a second distal receiving hole in the second conductor guide such that the conductor twists around the longitudinal axis of the first conductor guide.

19. The method of claim 18, further comprising placing an insulating spacer between the first conductor guide and the second conductor guide and between the flexible drive shaft and the conductor, wherein the insulating spacer surrounds at least a portion of the flexible drive shaft that is between the first conductor guide and the second conductor guide, and wherein the conductor twists around the insulating spacer.

20. A power cable comprising:
a first conductor guide comprising (i) a first plurality of distal receiving holes and (ii) a first axial receiving hole on a longitudinal axis of the power cable, wherein the first conductor guide comprises a rigid insulating material, and wherein each distal receiving hole of the first plurality of distal receiving holes is positioned at a common radial distance from the first axial receiving hole;
a second conductor guide comprising (i) a second plurality of distal receiving holes and (ii) a second axial receiving hole on the longitudinal axis of the power cable, wherein the second conductor guide comprises a rigid insulating material, and wherein each distal receiving hole of the second plurality of distal receiving holes is positioned at the common radial distance from the second axial receiving hole;
a flexible drive shaft that is disposed in the first axial receiving hole and the second axial receiving hole;
a plurality of conductors that twist around the longitudinal axis, wherein the plurality of conductors are disposed respectively in the first plurality of distal receiving holes and respectively in the second plurality of distal receiving holes, wherein for each conductor of the plurality of conductors, the distal receiving hole of the first plurality of distal receiving holes in which the conductor is disposed in is at an azimuthal position that is different from an azimuthal position of the distal receiving hole of the second plurality of distal receiving holes in which the conductor is disposed in;
an insulating spacer between the first conductor guide and the second conductor guide, wherein the insulating spacer surrounds at least a portion of the flexible drive shaft that is between the first conductor guide and the second conductor guide and is between the flexible drive shaft and the plurality of conductors, and wherein the plurality of conductors twist around the insulating spacer; and
an insulating jacket that surrounds the plurality of conductors, the first conductor guide, the second conductor guide, and the flexible drive shaft.

* * * * *